United States Patent [19]

Sogabe et al.

[11] Patent Number: 5,142,588
[45] Date of Patent: Aug. 25, 1992

[54] METHOD OF AND APPARATUS FOR MEASURING TRACK DISPLACEMENT ON A MAGNETIC TAPE

[75] Inventors: Yasushi Sogabe, Moriguchi; Kenji Matsuura; Shigeki Murata, both of Nara, all of Japan

[73] Assignee: Matsushita Electric Industrial Co., Ltd., Osaka, Japan

[21] Appl. No.: 645,740

[22] Filed: Jan. 25, 1991

[30] Foreign Application Priority Data

Jan. 29, 1990 [JP] Japan .................................. 2-18315

[51] Int. Cl.$^5$ .................................................. G06K 9/00
[52] U.S. Cl. ............................................ 382/8; 382/1; 358/106; 358/107
[58] Field of Search ................... 382/55, 8, 1; 356/32, 356/384; 358/101, 106, 107; 369/53

[56] References Cited

U.S. PATENT DOCUMENTS 4,638,388  1/1987  Hara ........................................ 360/18
4,853,967  8/1989  Mandeville ............................. 382/8

FOREIGN PATENT DOCUMENTS 55-117761  9/1980  Japan .
57-122308  7/1982  Japan .
59-14102   1/1984  Japan .
60-138702  7/1985  Japan .
2020012    11/1979 United Kingdom ................... 356/32

OTHER PUBLICATIONS

Liang et al., "Direct Determination of Flexural Strains in Plates Using Projected Gratings," VDI-Berichte Nr. 313, 1978, pp. 401-405.
Hamano, English Abstract for Japanese No. 57-122308, from A.P.S.
"Application of Moire Analysis of Strain Using Fourier Transform", Yoshiharu Morimoto et al., *Optical Engineering*, Aug. 1988, vol. 27, No. 8, pp. 650-656.
"Strain Measurement by Scanning-Moire Method", Yoshiharu Morimoto et al., *Bulletin of JSME*, vol. 27, No. 233, Nov. 1984, pp. 200-205.

*Primary Examiner*—Leo H. Boudreau
*Assistant Examiner*—Andrew W. Johns
*Attorney, Agent, or Firm*—Wenderoth, Lind & Ponack

[57] ABSTRACT

The amount of displacement of a track recorded on a magnetic tape from the linear state is analyzed by using an image analysis apparatus, and a two-dimensional distribution state of the displacement state is displayed, so that a difference in the displacement state due to the position on the magnetic tape can be known, while the changes in the longitudinal direction of the magnetic tape or the variation state of the displacement in the time course can be obtained.

8 Claims, 8 Drawing Sheets

METHOD OF AND APPARATUS FOR MEASURING TRACK DISPLACEMENT ON A MAGNETIC TAPE

BACKGROUND OF THE INVENTION

1. Field of the Invention

The present invention relates to a method of measuring the state of displacement of tracks recorded on a magnetic tape.

2. Description of the Prior Art

It is recently an important subject to narrow the track width as the high density recording of magnetic tape is being promoted. The improvement of the track linearity becomes more important as the track width becomes narrower. This is because of the fact that as the track is deformed, a track adjacent to the desired track is traced, or the head does not trace the desired track correctly and the reproduced signal deteriorates. It is therefore an essential matter to understand the displacement state of the track for achieving high density recording.

The conventional method of measuring track displacement was to develop and visualize the track recorded obliquely relative to the longitudinal direction of the magnetic tape by using magnetic fluid, read the track position along a line perpendicular to the longitudinal direction of the magnetic tape, and evaluate the linearity of the track by comparing between a read position and a reference position without deformation of the track (e.g. Japanese Laid-open Patent No. 62-172505).

In such a conventional method and composition, however, since the track displacement amount generally differs at different positions in the longitudinal direction of the magnetic tape, the data varies when several points on the magnetic tape are measured, so that an accurate evaluation is difficult. Besides, since position data read from several tracks are assumed equivalent to position data of one track, the obtained track deformation amount is an average with respect to time, so that the changes of the track linearity with respect to time cannot be detected.

SUMMARY OF THE INVENTION

It is hence a primary object of the invention to present a method and apparatus capable of two-dimensionally measuring the track displacement to effect an accurate evaluation.

To achieve the above object, a method of the invention comprises an image pickup step for obtaining a track image by picking up a track pattern in a specified region on a magnetic tape by an image device, an image analysis step for analyzing an obtained track pattern image and calculating a displacement amount from a linear state of a track, and a display step for displaying a track displacement state obtained from the image analysis step.

By displaying a two-dimensional distribution state of the displacement amount from the linear state of the track recorded on a magnetic tape, the difference in the displacement state depending on the position on the magnetic tape can be confirmed, and also the variation in the longitudinal direction of the magnetic tape, or the variation of the displacement with respect to time, can be obtained. Therefore, by using such track displacement information and strictly analyzing factors causing the track displacement, it is possible to remove such factors which reduce the track linearity. As a result, a rotating head apparatus applicable to high density recording can be produced.

DESCRIPTION OF THE PREFERRED EMBODIMENT

Figure 1:
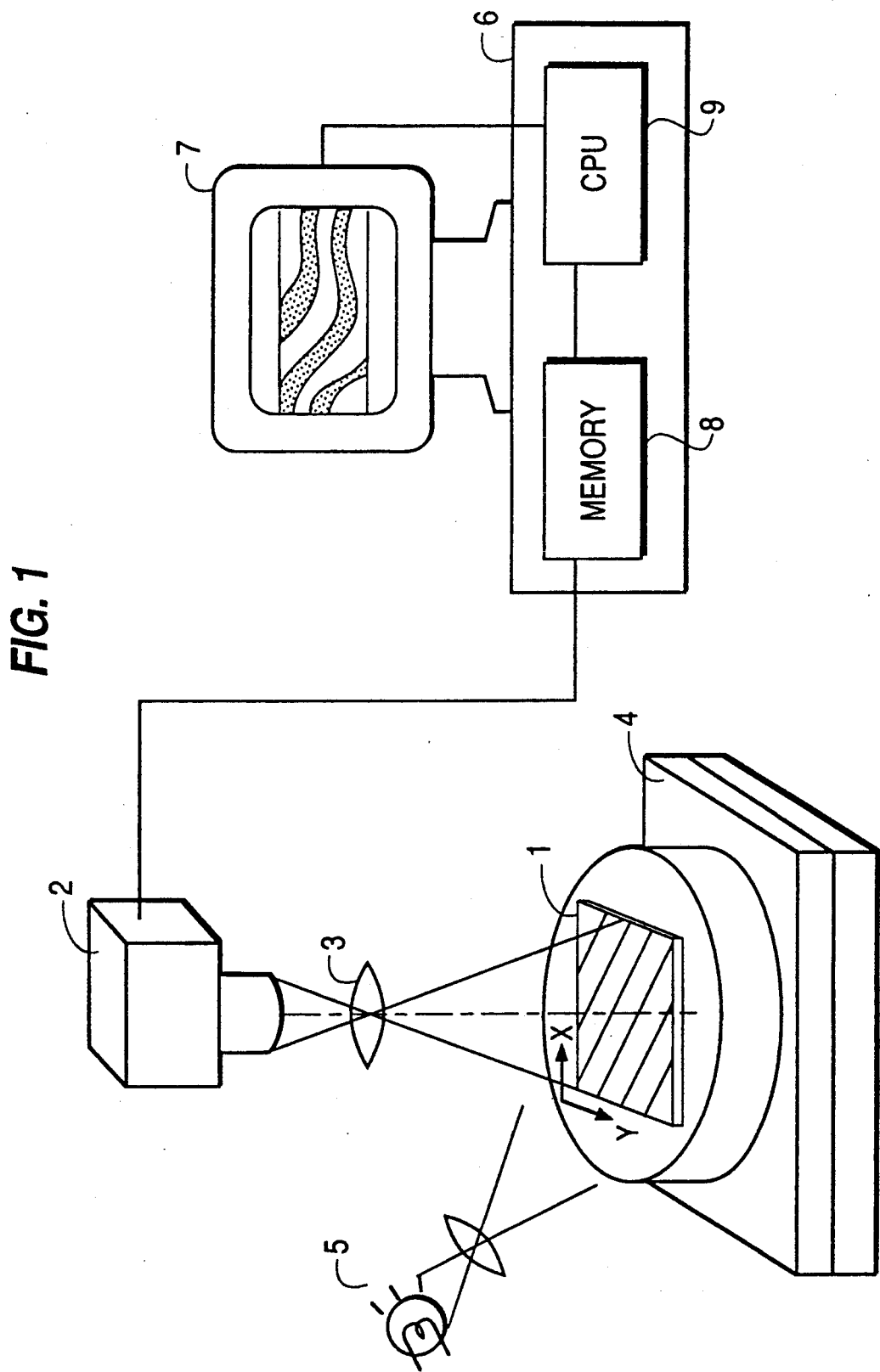
FIG. 1 is a diagram of a track displacement measuring apparatus in accordance with the present invention.
Figure 2:
FIG. 2 is a diagram of a deformed track image which has been visualized and picked up.

Referring now to the drawings, the track displacement measuring apparatus according to the first embodiment is described in detail below. FIG. 1 is a track displacement measuring apparatus showing a first embodiment of the present invention. A magnetic tape 1 which is been cut to a proper length is used to visualize the track pattern by developing with the aid of a magnetic fluid after recording the signal as shown in the prior art. The magnetic tape 1 records by providing the track with an azimuth angle in order to avoid deterioration of the signal even if a signal of an adjacent track is read by mistake. For example, in the case of VHS video tapes, an inclination angle of ±6° to the track is provided. Therefore, when the magnetic tape 1 is illuminated with a light source 5 from a direction nearly vertical to one azimuth angle, every other track is observed brightly, and a grid pattern of bright and dark parts is observed on the whole. The developed stat of the magnetic tape 1 is influenced by the signal being recorded. As mentioned below, since this track pattern is processed as a grid pattern by image input, it is better when the brightness of one track is uniform, and the signal to be recorded should be preferably of a specific frequency. For example, to obtain a favorable state of development, the recording frequency may be in a range of 1 MHz to 3 MHz. Next, thus visualized magnetic tape 1 is focused on a television camera 2 through a magnifying lens 3, and a table 4 on which the magnetic tape 1 is placed is moved, thereby adjusting it so that the longitudinal direction of the magnetic tape 1 may nearly coincide with the x-axis of the input image. FIG. 2 is an input image of the obtained track, which is a grid image becoming bright and dark in every other track. The input image is sent from the television camera 2 in FIG. 1 into a memory 8 in an image analysis device 6. The input image in FIG. 2 sent into the memory 8 is displayed in an image display device 7 by calculating track deformation amount by using a program incorporated in a central processing unit 9.

The image analysis device 6 and display device 7 in FIG. 1 are described in detail below. Methods of determining the amount of deviation from a reference position of the grid image shown in FIG. 2 include, for example, the moire method and grid method. These methods are applied in shape measurement, stress or strain measurement, and are intended to determine the shape, stress or strain of an object by determining the amount of displacement of a grid pattern projected on the object to be measured by using a projection device, or by using a device which is adhered to the surface of the object to be measured.

In this embodiment, the method of image analysis of track displacement by the grid method using a Fourier transform is shown. Incidentally, the grid method using the Fourier transform has been already reported as being used in the strain measurement of an object surface ("Application of moire analysis of strain using Fourier transform": Optical engineering, August 1988, Vol. 27, No. 8). Only the outline is shown here.

Figure 3:
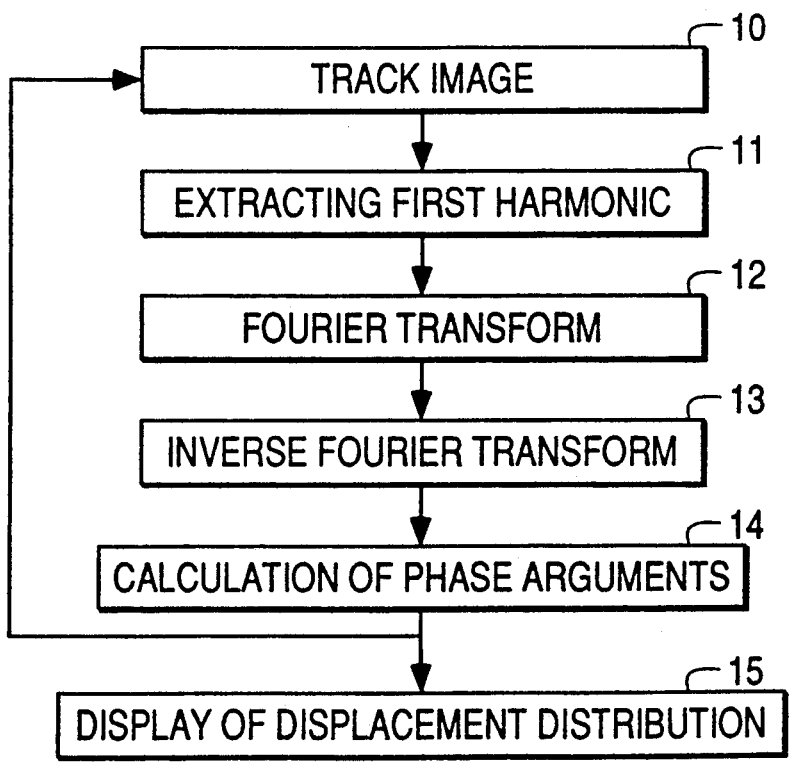
FIG. 3 is a flowchart showing a method of image analysis in accordance with a first embodiment of the present invention.

FIG. 3 is a flowchart showing the outline of the image analysis method of this embodiment. The method of image analysis is explained herein according to the flow chart.

Figure 4:
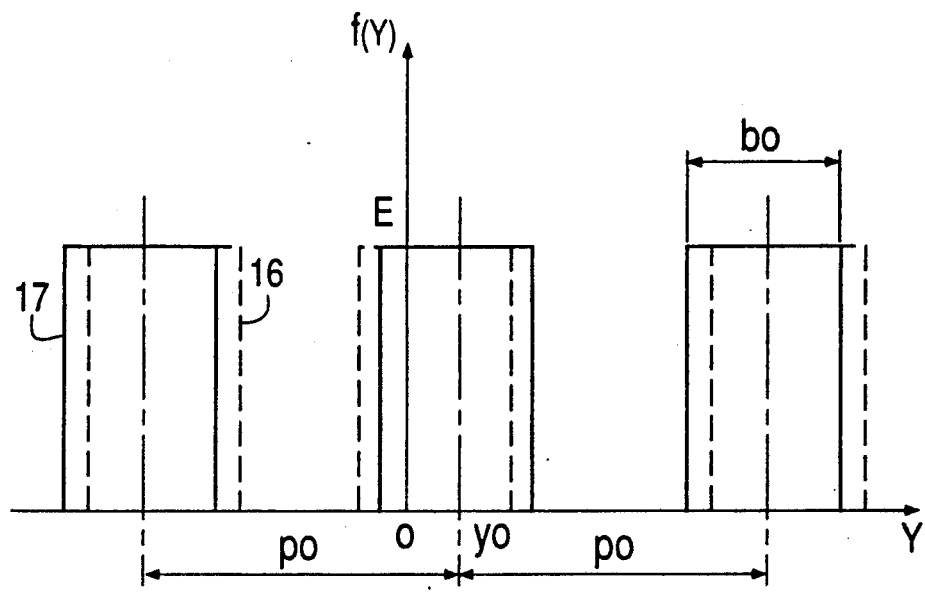
FIG. 4 is a diagram showing a brightness distribution in a Y-direction at an arbitrary X-coordinate on the image shown in FIG. 2.

Step 10 in FIG. 3 is a track image cutting step for cutting the image on an arbitrary x-coordinate of the image fed in the memory 8 in FIG. 1. The subsequent processing of steps 10 to 14 in FIG. 3 is carried out independently and repeatedly on every image X-coordinate by the central processing unit 9 in FIG. 1. FIG. 4 is a brightness distribution in the Y-direction of the track image being cut out. Element E is the brightness of the track bright part; element $b_0$ is the width of the track bright part that is not deformed; element $P_0$ is the pitch of its bright part, and element $y_0$ is the initial phase. A waveform 16 of the deformed track image in FIG. 2 is moving in the Y-direction with respect to a waveform 17 assuming that the track is not deformed. Therefore, by determining the moving distance from the waveform 16 and the corresponding waveform 17, the displacement amount of the track is obtained. FIG. 4 shows rectangular waves as the waveforms of the track brightness, but other periodic waveforms may be also produced due to the brightness resolution of the input device.

Assuming that the waveform 17 in FIG. 4 is a function f (y), and defining the fundamental frequency of waveform $\omega_0$ to be $\omega_0 = 1/P_0$, by Fourier series development, the function f (y) may be expressed as follows:

$$f(y) = \sum_{n=-\infty}^{\infty} C_n \exp[j2n\pi \omega_0 (y - y_0)] \quad (1)$$

$$C_0 = b_0 E/P_0$$

$$C_n = C_o \sin(n\pi \omega_0 b_0)/n\pi \omega_0 b_0$$

Assuming the displacement amount at an arbitrary coordinate Y on the waveform 16 to be u (Y), the coordinate y on the waveform 17 corresponding to the coordinate Y on the waveform 16 will be y = Y − u (Y). If the waveform 16 in FIG. 4 is g (Y), since g (Y) is equal to the brightness f (y) at the position of y on the waveform 17, it follows that g (Y) = f (y). Therefore, from equation (1), g (Y) is expressed as follows:

$$g(Y) = f(Y - u(Y)) \quad (2)$$
$$= \sum_{n=-\infty}^{\infty} C_n \exp[j2n\pi \omega_0 (Y - u(Y) - y_0)]$$

where if $i_n(Y) = C_n \exp[-j2n\pi \omega_0 (u(Y) + y_0)]$, then equation (2) may be rewritten as follows.

$$g(Y) = \sum_{n=-\infty}^{\infty} i_n(Y) \exp[j2n\pi \omega_0 Y] \quad (3)$$

Consequently, the track image 10 in FIG. 3, that is, the waveform corresponding to equation (3) is subjected to the Fourier transform 11 in FIG. 3. Since the track is deformed, the Fourier spectra obtained by Fourier transform 11 are spread near the frequency of integer multiples of $\omega_0$ as shown by element 18 in FIG. 5. Element 19 in FIG. 5 is a Fourier spectrum without deformation, and it has a spectrum at a frequency of an integer multiple of $\omega_0$.

Figure 5:
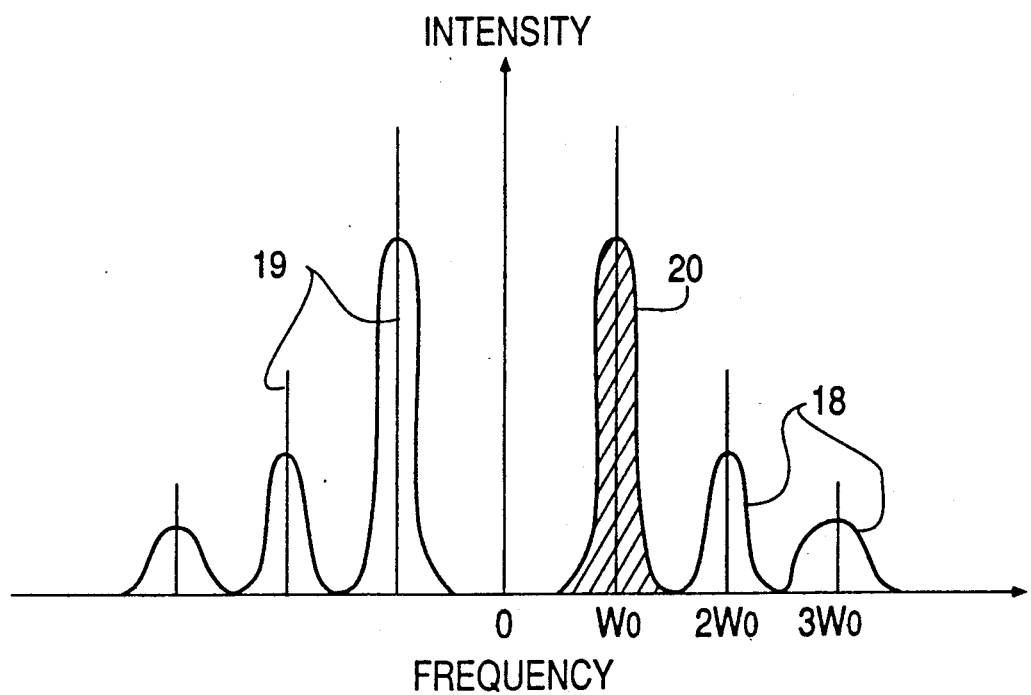
FIG. 5 is a diagram of a frequency spectrum obtained by a Fourier transform from the image of FIG. 2 and frequency spectrum of a track which is not deformed.

Then, as shown by element 13 in FIG. 3, of the Fourier spectrum 18 in FIG. 5, a primary harmonic wave 10 is taken out to be subjected to an inverse Fourier transform. If the function after an inverse Fourier transform is $g_1(Y)$, it follows that $$g_1(Y) = C_1 \exp[-j2\pi \omega_0 (u(Y) + y_0 - Y] \quad (4)$$

In succession, the phase angle calculation 14 in FIG. 3 is explained.

In equation (4), $g_1(Y)$ is indicated as complex, and hence there are real parts Re $\{g_1(Y)\}$ and imaginary parts Im $\{g_1(Y)\}$. The phase $\theta(Y)$ of the waveform 16 in the Y-coordinate obtained from equation (4) may be expressed as follows:

$$\theta(Y) = 2\pi \omega_0 (Y - u(Y) - y_0)$$

On the other hand, the phase of the waveform 17 which is not deformed is obtained by calculation as follows:

$$\theta_0(Y) = 2\pi \omega_0 (Y - y_0)$$

Therefore, the displacement amount u (Y) in the Y-coordinate is determined as follows.

$$(Y) = (\theta_0(Y) - \theta(Y)/2\pi\omega_0 \quad (5)$$

However, since the phase value is determined from the argument $\phi(Y)$ of equation (6), the angle is determined only in a range of $-\pi$ to $\pi$.

$$\phi(Y) = \tan^{-1}[Im\{g_1(Y)\}/Re\{g_1(Y)\} \quad (6)$$

Therefore, it is necessary to link smoothly to transform into phase value. The details of this operation are described in "Application of moire analysis of strain using Fourier transform," Optical Engineering, August 1988, Vol. 27, NO. 8.

Thus, by processing from 10 to 14 in FIG. 3 in every X-coordinate of the image, the displacement amount is obtained in each pixel unit of the entire picture. FIG. 5 shows the processing of the waveform in the y-direction, but the waveforms in the x-direction may be handled in the same manner.

The displacement distribution display 15 in FIG. 3 is a step of displaying the displacement obtained on the entire image by the processing in 10 to 14 in FIG. 3 in the display device in FIG. 1 by converting it into the brightness of an image. To convert the displacement into the image brightness, a specific range of the displacement is assigned to have the same brightness. Or the display method of the displacement obtained on the whole image may be indicated by other methods, without using the brightness of the image.

Figure 6:
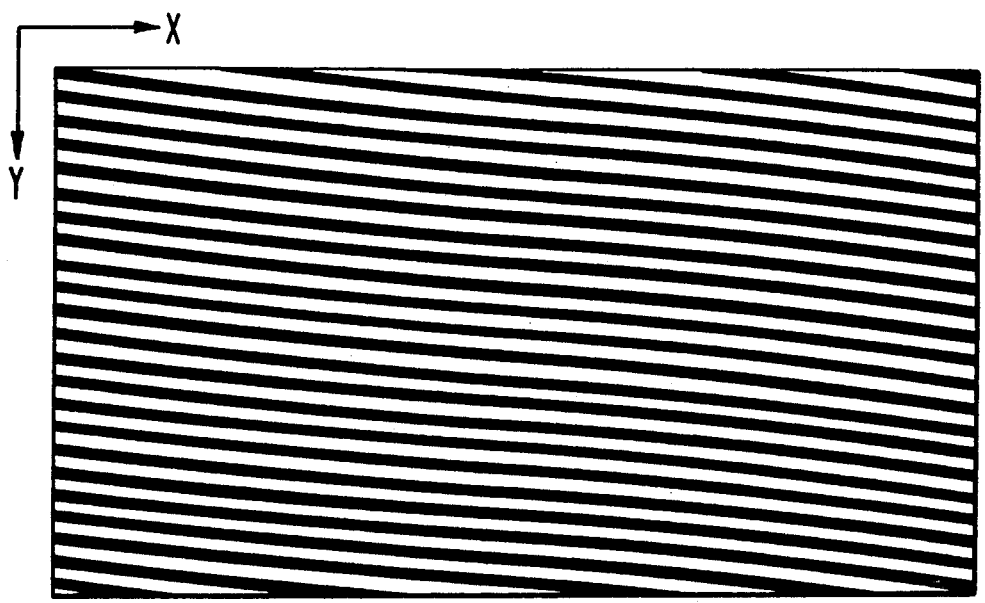
FIG. 6 is a diagram of a track deformation image created by simulation.
Figure 7:
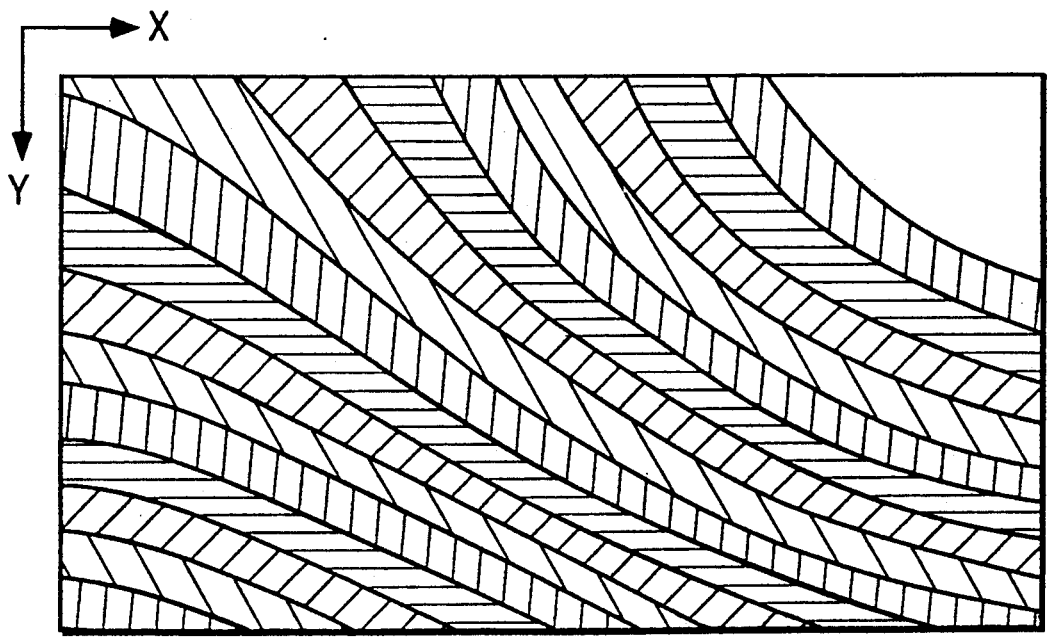
FIG. 7 is a diagram showing a track displacement distribution obtained by analyzing FIG. 6 by the method in accordance with the first embodiment of the present invention.

FIGS. 6 and 7 are examples of measuring track displacement by the grid method using the Fourier transform of the embodiment of the present invention. FIG. 6 is a deformed track image obtained by picking up the visualized magnetic tape 1 by using the image input device 2, and a very small deformation not judged visually is shown. FIG. 7 shows the distribution of the displacement calculated on every picture element, and the displacement distribution shows the displacement amount included in the same region in a same pattern. Therefore, the boundary line of the pattern indicates the displacement contour line.

By such constitution, the displacement information of high resolution is obtained, in which the displacement amount from the linear state of the track recorded on a magnetic tape is known, and by displaying the two-dimensional distribution state it is possible to check the displacement state at the position inside the magnetic tape and obtain the variation of the timewise displacement or the changes in the longitudinal direction of the magnetic tape.

Figure 8:
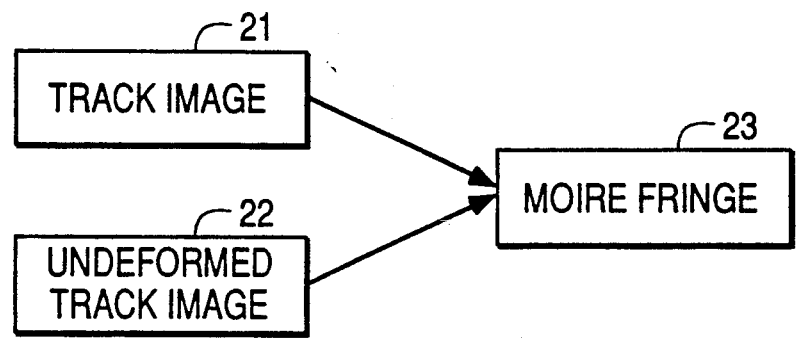
FIG. 8 is a flowchart showing the image analysis method in accordance with a second embodiment of the present invention.
Figure 9:
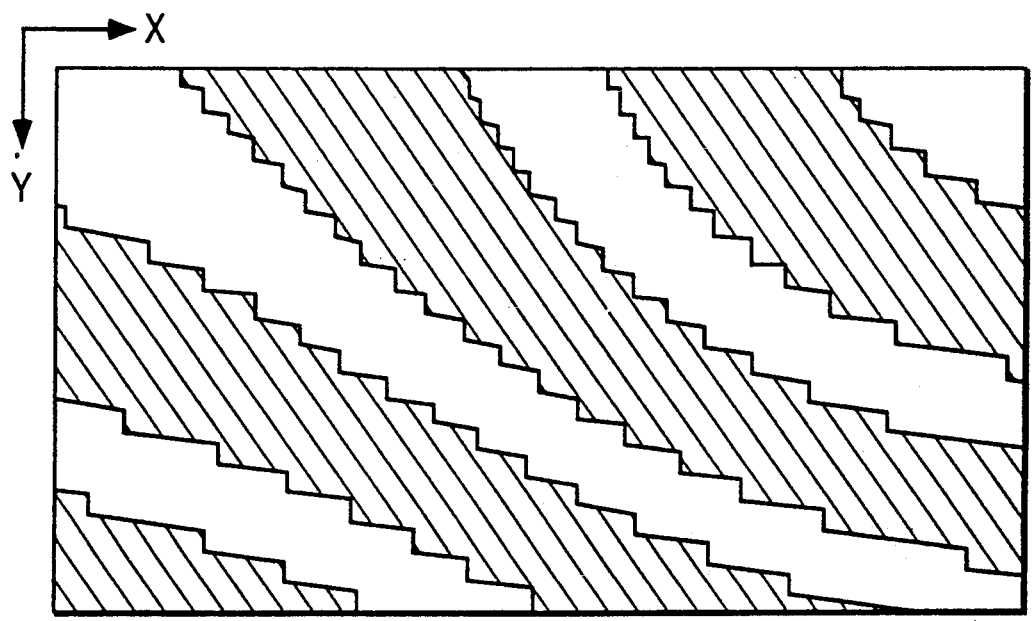
FIG. 9 is a diagram of a fringe image produced when an image without track deformation is overlaid on the track image shown in FIG. 6.

A track displacement measuring apparatus in accordance with a second embodiment of the present invention is described below while referring to the drawings. The measuring apparatus is composed in same way as in the first embodiment, except that the analyzing mean of the imaging analysis device 6 is different. FIG. 8 is a flowchart schematically showing the method of imaging analysis of the second embodiment. Element 21 in FIG. 8 is a deformed track image, and it is fed in the memory 8 in FIG. 1. Element 22 in FIG. 8 is an image stored in the memory 8 by creating an image without track deformation corresponding to 21 by computing in the central processing unit 9 in FIG. 1. Overlapping these images 21 and 22 in FIG. 8, a fringe image 23 corresponding to displacement contour line is obtained. The obtained fringe image is displayed on the display device 7 in FIG. 1. FIG. 9 shows a fringe image obtained by overlapping the undeformed track image on the deformed track image shown in FIG. 6. A distribution similar to the displacement distribution in FIG. 7 obtained in the first embodiment is obtained in a more sparse interval state.

The fringe image produced by overlapping the undeformed grid pattern and deformed grid pattern in this way is a called moire pattern. Since this moire pattern indicates the displacement contour lines of the deformed grid pattern, it is generally used in measurement of shape, stress and strain of an object.

Figure 10:
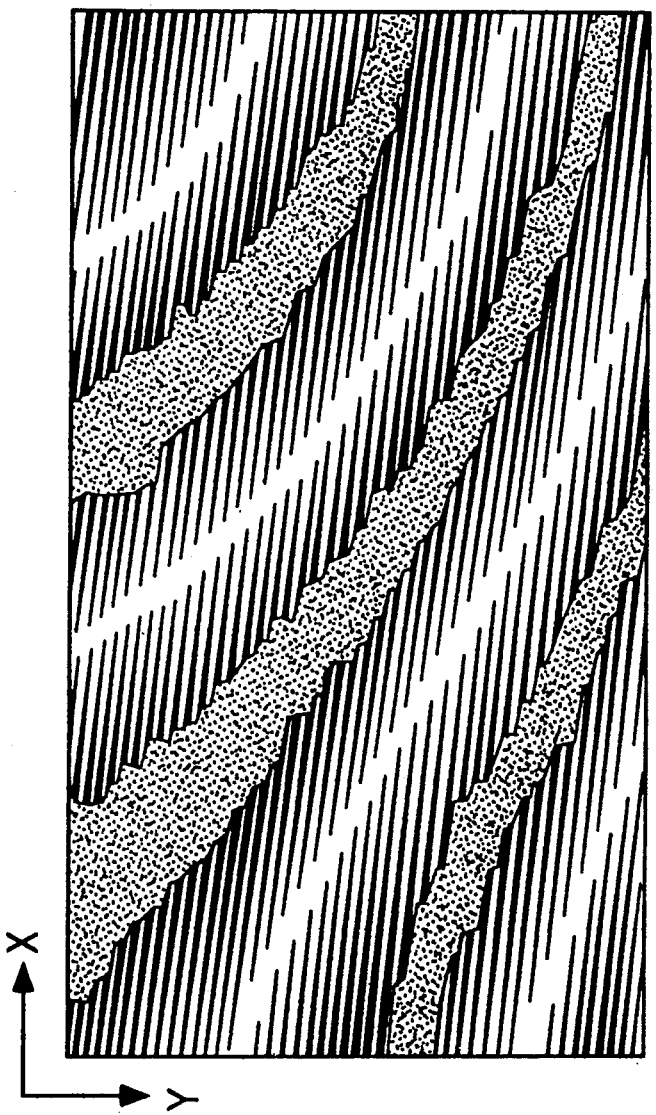
FIG. 10 is a diagram of a fringe image obtained by producing moire fringe by thinning the scanning lines of the track image in FIG. 6.

Therefore, as shown in the flowchart in FIG. 8, by overlapping the deformed track image and undeformed track image as shown in FIG. 8 flowchart, the state of deformation of the track may be qualitatively known. Besides, by inputting the position of the moire fringe on the image and the number of lines of the moire fringe into the central processing unit, a quantitative displacement amount is obtained. In this embodiment, the method of overlapping the deformed track on the undeformed track was employed in order to obtain the moire fringe, but this method is not limitative as long as a moire fringe is obtained. For example, the moire fringe obtained by a method of thinning the scanning lines of the track image in FIG. 6 is shown in FIG. 10. This method is described in detail in "Strain Measurement by Scanning-moire Method," Bulletin of JSME, Vol. 27, No. 223, November 1984.

By the simple processing of overlapping of images in such a constitution, the state of displacement from a linear state of a track recorded on a magnetic tape may be obtained two-dimensionally.

Figure 11:
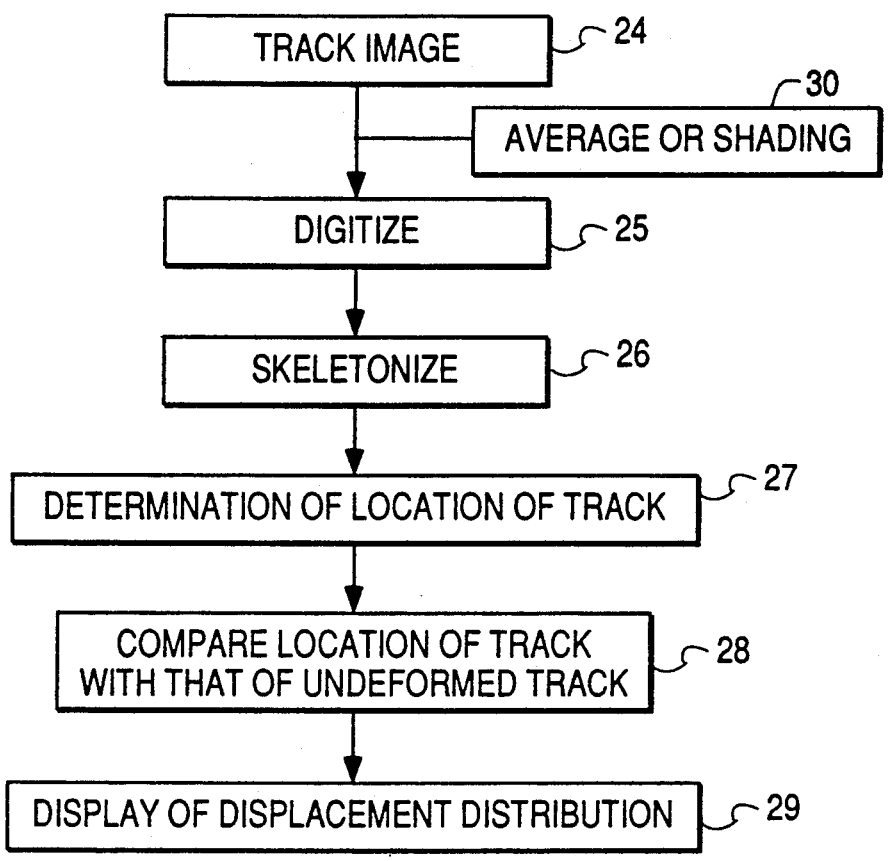
FIG. 11 is a flowchart showing a method of image analysis in accordance with a third embodiment of the present invention.

According to a third embodiment of the present invention, a track displacement measuring apparatus is described in detail below with reference to drawings. The measuring apparatus is composed in the same way as in the first embodiment, except that the analyzing means of the imaging analysis device 6 is different. FIG. 11 is a flowchart schematically showing the method of imaging analysis of this embodiment.

The method of imaging analysis of the third embodiment of the present invention is to obtain the amount of deformation by directly detecting the position on the image of track fringe and comparing with a position without deformation. Element 24 in FIG. 11 is a deformed track image taken into the memory 8 in FIG. 1. In order to obtain the state of deformation of track directly from the track image 24, the position of each track on the image must be located. However, since each track has its own thickness and brightness gradation of multiple values, the track position cannot be determined correctly on the original image. Accordingly, by the program incorporated in the central processing unit 9 in FIG. 1, the image 24 in FIG. 11 is digitized in step 25. Furthermore, to determine the central position of the track having a certain thickness as a result of the digitization, the digitized image in FIG. 11 is skeletonized in step 26. The detected central position of the track is read and determined as shown in step 27 in FIG. 11. Next, as shown in step 28, the read track position is compared with a calculated track position without deformation, and the amount of deformation is obtained. The obtained amount of deformation is determined for each track, and by necessary interpolations the displacement distribution on the entire image is obtained. The displacement distribution is displayed by the display device 7 in FIG. 1 in the display step 29 in FIG. 11.

The basic processing is the steps 24 to 29 in FIG. 11, and in addition, image averaging or shading correction may be also effected as indicated in step 30 in FIG. 11. Averaging is intended to eliminate small amounts of noise, if any, from the track image 23, and shading correction is to make the contrast uniform when the level of digitization in step 25 cannot be determined because the bright and dark contrast of the track image 24 differs in parts of the image.

Figure 12:
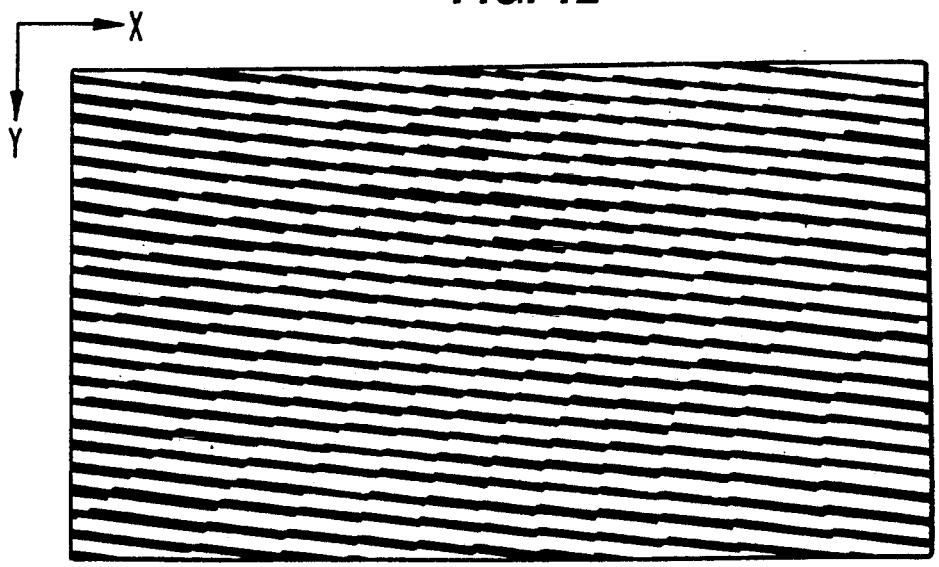
FIG. 12 is a diagram of a digitized image of the track image shown in FIG. 6.
Figure 13:
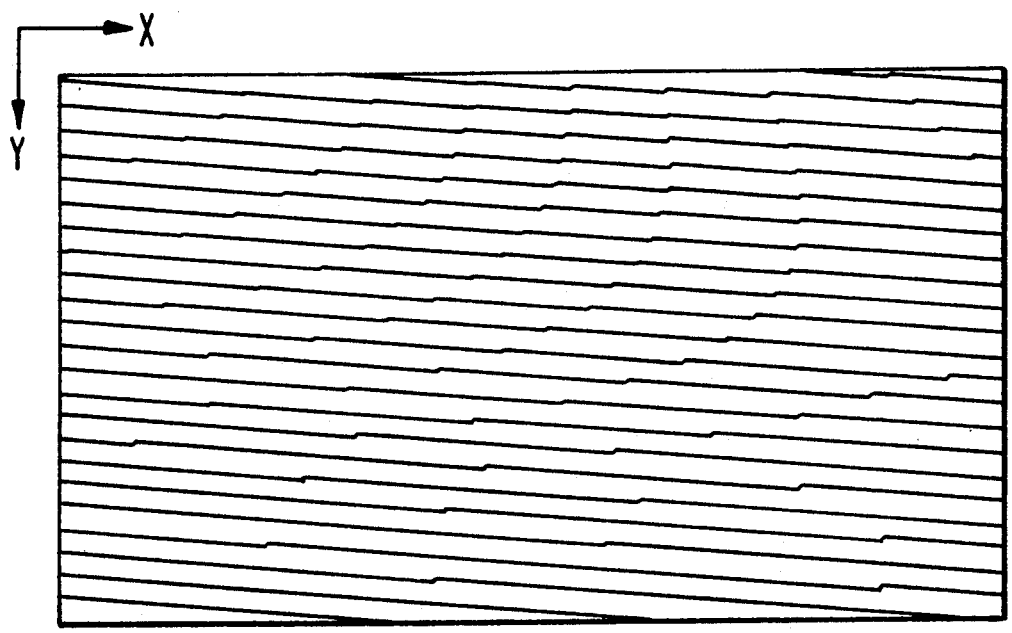
FIG. 13 is a diagram of a skeletonized image of the digitized image shown in FIG. 12.

Examples of analysis by this embodiment are shown in FIGS. 12 and 13. FIG. 12 is a digitized image of the track image in FIG. 6, and FIG. 13 is a skeletonized image of the digitized image. As a result, the distribution of displacement is the same as in FIG. 7.

By digitizing and skeletonizing the track position on the image in such a constitution, the state of displacement from a linear state of the track recorded on a magnetic tape can be obtained two-dimensionally.

In the foregoing embodiments, the grid method using the Fourier transform, moire method and skeletonizing method are presented in relation to the method and apparatus for imaging analysis, but, needless to say, other grid image analysis methods may be employed as long as the state of track deformation may be obtained.

What is claimed is:

1. A method of measuring track displacement comprising:
    a track forming step for recording a signal of a specific frequency on a magnetic tape to form a plurality of tracks on the magnetic tape, each two adjacent tracks of the plurality of tracks being formed with different azimuth angles from each other;
    an image visualizing step for visualizing a pattern of the plurality of tracks on the magnetic tape;
    an image pickup step for picking up a two-dimensional image of the pattern of the plurality of tracks to obtain a two-dimensional track pattern image;
    an image analysis step for analyzing the two-dimensional track pattern image obtained from the image pickup step and calculating an amount of displacement of a track from a linear state; and
    a display step for displaying a state of displacement of the track obtained from the image analysis step.

2. A method according to claim 1, wherein the image analysis step comprises a step of taking out a primary frequency component of Fourier spectrum obtained by a Fourier transform of the track image obtained from the image pickup step, converting a track position into a phase value by a reverse Fourier transform, and determining a difference from a reference phase value to calculate the amount of displacement of the track from the linear state.

3. A method according to claim 1, wherein the image analysis step comprises a step of analyzing a fringe image produced by overlapping the track image obtained from the image pickup step and a track image created by assuming that the track is linear, and a step of calculating the amount of displacement of the track from the linear state.

4. A method according to claim 1, wherein the image analysis step comprises a step of detecting a central position of the track by digitizing and skeletonizing the image obtained from the image pickup step, and a step of calculating the amount of displacement of the track from the linear state.

5. An apparatus for measuring a displacement of a track on a magnetic tape on which a signal of a specific frequency have been recorded to form a plurality of tracks, each two adjacent tracks having been formed with different azimuth angles from each other, and a pattern of the plurality of tracks having been visualized, said apparatus comprising:
    an image pickup means for picking up a two-dimensional image of the pattern of the plurality of tracks to obtain a two-dimensional track pattern image;
    a memory means for storing therein the two-dimensional track pattern image obtained by the image pickup means;
    an image analysis means for analyzing the two-dimensional track pattern image stored in the memory means and calculating an amount of displacement of a track from a linear state; and
    a display means for displaying a state of displacement of the track obtained from the image analysis means.

6. An apparatus according to claim 5, wherein the image analysis means comprises a means for taking out a primary frequency component of Fourier spectrum obtained by Fourier transform of the two-dimensional track pattern image stored in the memory means, a means for converting a track position into a phase value by a reverse Fourier transform, and a means for determining a difference from a reference phase value to calculate the amount of displacement of the track from the linear state.

7. An apparatus according to claim 5, wherein the image analysis means comprises a means for analyzing a fringe image produced by overlapping the two-dimensional track pattern image stored in the memory means and a track image created by assuming that the track is linear, and a means for calculating the amount of displacement of the track from the linear state.

8. An apparatus according to claim 5, wherein the image analysis means comprises a means for detecting a central position of the track by digitizing and skeletonizing the two-dimensional track pattern image stored in the memory means, and a means for calculating the amount of displacement of the track from the linear state.

* * * * *